United States Patent
Ogara

(12) United States Patent  (10) Patent No.: US 9,648,243 B2
Ogara  (45) Date of Patent: May 9, 2017

(54) IMAGE CAPTURING APPARATUS AND CONTROL METHOD THEREOF

(71) Applicant: CANON KABUSHIKI KAISHA, Tokyo (JP)

(72) Inventor: Keita Ogara, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 226 days.

(21) Appl. No.: 14/679,489

(22) Filed: Apr. 6, 2015

(65) Prior Publication Data

US 2015/0294146 A1  Oct. 15, 2015

(30) Foreign Application Priority Data

Apr. 15, 2014 (JP) ................. 2014-083988

(51) Int. Cl.
*H04N 5/232* (2006.01)
*H04N 5/225* (2006.01)

(52) U.S. Cl.
CPC ..... *H04N 5/23293* (2013.01); *H04N 5/23245* (2013.01); *H04N 5/2252* (2013.01); *H04N 5/23216* (2013.01)

(58) Field of Classification Search
None
See application file for complete search history.

(56) References Cited

FOREIGN PATENT DOCUMENTS

JP 2000-041169 A 2/2000

*Primary Examiner* — Roberto Velez
*Assistant Examiner* — Yih-Sien Kao
(74) *Attorney, Agent, or Firm* — Cowan, Liebowitz & Latman, P.C.

(57) ABSTRACT

An image capturing apparatus comprises a display unit connected to an apparatus through a movable portion so that a direction of a display surface is changeable; a detection unit configured to detect a rotation position of the display unit; and a display control unit configured to perform a change in a direction of information displayed on the display surface based on comparison between the detected rotation position and a threshold, wherein the display control unit sets such that a first threshold serving as a threshold of the rotation position in a mode in which a handwritten input to the display surface is allowed is made different from a second threshold serving as a threshold of the rotation position in another mode.

13 Claims, 12 Drawing Sheets

| | $\theta < \beta$ | $\beta \leq \theta < \alpha$ | $\theta \geq \alpha$ |
|---|---|---|---|
| NORMAL MODE PROJECTION 303 | OFF | OFF | ON |
| HANDWRITTEN MODE PROJECTION 304 | OFF | ON | ON |

|  | $\theta < \beta$ | $\beta \leq \theta < \alpha$ | $\theta \geq \alpha$ |
|---|---|---|---|
| NORMAL MODE PROJECTION 303 | OFF | OFF | ON |
| HANDWRITTEN MODE PROJECTION 304 | OFF | ON | ON |

IMAGE CAPTURING APPARATUS AND CONTROL METHOD THEREOF

BACKGROUND OF THE INVENTION

Field of the Invention

The present invention relates to an image capturing apparatus and a control method thereof and, more particularly, to a technique for controlling display on a display unit rotatable with respect to the image capturing apparatus.

Description of the Related Art

In recent years, there has been developed an information input apparatus capable of drawing a handwritten character or figure on a display panel by designating a position on a display panel having a touch panel when a user uses a finger, an electronic pen, or the like. In such an information input apparatus, the user can directly designate various buttons and menus displayed on the display panel. For this reason, the user can quickly and easily perform an input operation as compared with the operations using the cursor keys of a keyboard and a mouth.

According to these advantages, the above information input apparatus can be employed in an image capturing apparatus such as a video camera and used in a handwritten mode for combining and recording a shot image and information such as a character or figure handwritten with the electronic pen or the like.

The user can arbitrarily rotate the display panel of a video camera in normal shooting in which image capturing is performed while a display surface faces the user side and facing shooting in which the display surface faces the object side. Japanese Patent Laid-Open No. 2000-41169 discloses a technique for controlling a horizontal scanning order for a handwritten input so that information handwritten-input on the display panel which is reversed vertically and horizontally is appropriately recorded.

A general video camera performs shooting while the user holds an image capturing apparatus with his right hand and a display panel is open to the left hand side with respect to a camera body. In such a display panel, when the user is a right-handed person, it is not easy to perform a handwritten input with the electronic pen because the right hand contacts the camera body. On the other hand, when the display panel is rotated toward the object side, the right hand will not contact the camera body, but the camera becomes unstable because the camera body is held with the left hand. When the camera body is placed on a flat surface so as to stabilize the camera body, it is difficult to make the electronic pen contact the display surface of the display panel because the display surface is perpendicular to the camera placement surface. As a measure for facilitating contact of the electronic pen on the display panel, there is available a method of storing the display panel rotated toward the object side by reversing the display panel with respect to the camera body. However, since the camera has many curved portions on the outer shape, the camera may not be stabilized even if it is placed on the flat surface.

SUMMARY OF THE INVENTION

The present invention has been made in consideration of the aforementioned problems, and realizes a display control technique capable of appropriately displaying an image or any other information for a handwritten input on a display unit rotatable with respect to an image capturing apparatus.

In order to solve the aforementioned problems, the present invention provides an image capturing apparatus comprising a display unit connected to an apparatus through a movable portion so that a direction of a display surface is changeable; a detection unit configured to detect a rotation position of the display unit; and a display control unit configured to perform a change in a direction of information displayed on the display surface based on comparison between the detected rotation position and a threshold, wherein the display control unit sets such that a first threshold serving as a threshold of the rotation position in a mode in which a handwritten input to the display surface is allowed is made different from a second threshold serving as a threshold of the rotation position in another mode.

In order to solve the aforementioned problems, the present invention provides a control method of an image capturing apparatus including a display unit connected to an apparatus through a movable portion so that a direction of a display surface is changeable, the control method comprising: a detection step of detecting a rotation position of the display unit; and a display control step of performing a change in a direction of information displayed on the display surface based on comparison between the detected rotation position and a threshold, wherein in the display control step, a first threshold serving as a threshold of the rotation position in a mode in which a handwritten input to the display surface is allowed is made different from a second threshold serving as a threshold of the rotation position in another mode.

According to the present invention, an image or any other information for a handwritten input can be appropriately displayed on a display unit rotatable with respect to an image capturing apparatus.

Further features of the present invention will become apparent from the following description of exemplary embodiments (with reference to the attached drawings).

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

First Embodiment

An embodiment in which an image capturing apparatus of the present invention is applied to an image capturing apparatus such as a video camera which shoots a still image or movie will be described below.

(1. Arrangement of Video Camera 100)

Figure 1:
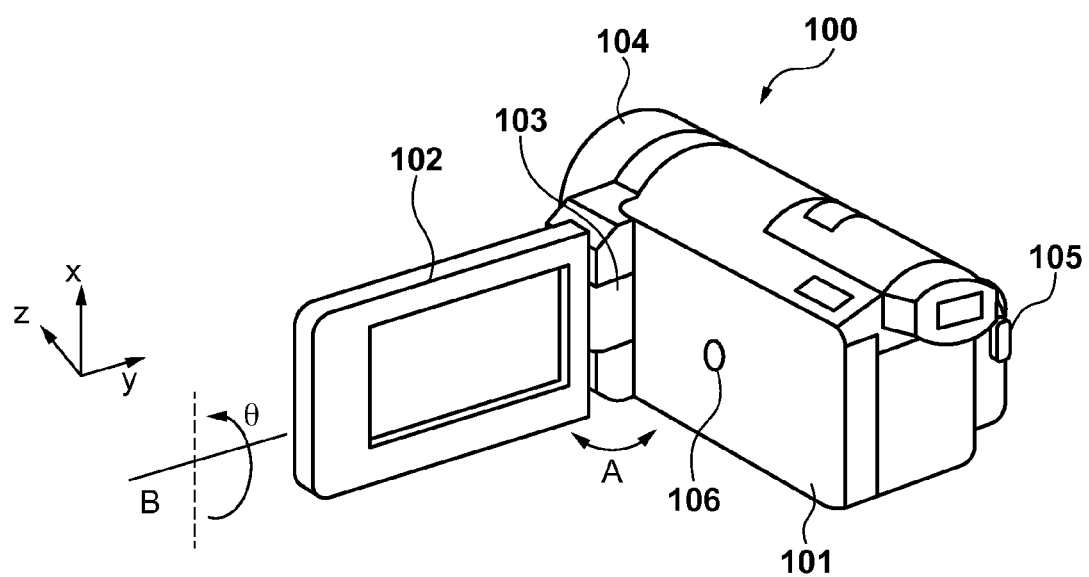
FIG. 1 is a perspective view of a video camera according to an embodiment of the present invention.

The arrangement and functions of the image capturing apparatus according to this embodiment of the present invention will be described with reference to FIGS. 1 and 2. FIG. 1 shows the outer appearance of a video camera 100 according to the first embodiment.

The direction of the display surface of a display unit 102 can be changed. The display unit 102, for example, comprises an LCD panel or organic EL panel connected to be rotatable with respect to a video camera body 101. The display unit 102 is connected to the camera body by a hinge portion 103 through a movable portion and is also electrically connected to the camera body. The hinge portion 103 holds the display unit 102 to be rotatable about two axes (x and y directions) perpendicular to the optical axis. When the video camera body 101 is set in a horizontal state, the display unit 102 is openable in the lateral direction (direction indicated by an arrow A) using the x-direction axis as the rotation axis and is rotatable in the back-and-forth direction (direction indicated by an arrow B) using the y-direction axis as the rotation axis. In normal shooting in which shooting is performed when the display surface faces the user side, the display unit 102 faces the user side (−z direction) along the z-axis parallel to the optical axis. In facing shooting in which shooting is performed when the display surface faces the object side, the display unit 102 faces the object side (z direction) parallel to the optical axis. The display unit 102 displays a live view movie or an image captured in accordance with an instruction from a control unit 205 or an operation menu. The display unit 102 has a touch panel of, for example, an electromagnetic induction method or capacitance type and is configured to allow the user to draw an arbitrary character or figure on a panel with a finger or electronic pen. An imaging optical system 104 comprises a shooting lens including a zoom lens and a focus lens and includes a stop and the like.

An operation unit 105 includes switches, buttons, and a touch panel. The operation unit 105 includes a recording button for designating the start or stop of recording. The touch panel included in the operation unit 105 notifies the control unit 205 of information such as a position on the panel when detecting an operation by the user. The control unit 205 controls each functional block in accordance with the detected position on the panel or its operation contents. For example, in the handwritten mode, when the locus of a finger or electronic pen input from a touch panel 209 is detected, the control unit 205 causes the display nit 102 to display the detected locus as superimposed display data to a video signal processing unit 204.

A mode selection switch 106 is a switch for selecting a camera operation mode. The operation modes include a still image recording mode, and a movie recording mode, a playback mode. The user operates the mode selection switch 106 to select each mode. The user operates the mode selection switch 106 to select a handwritten mode capable of performing a handwritten input on the display surface through the touch panel in each of the above modes. In the following description, modes other than the handwritten mode are called normal modes.

Figure 2:
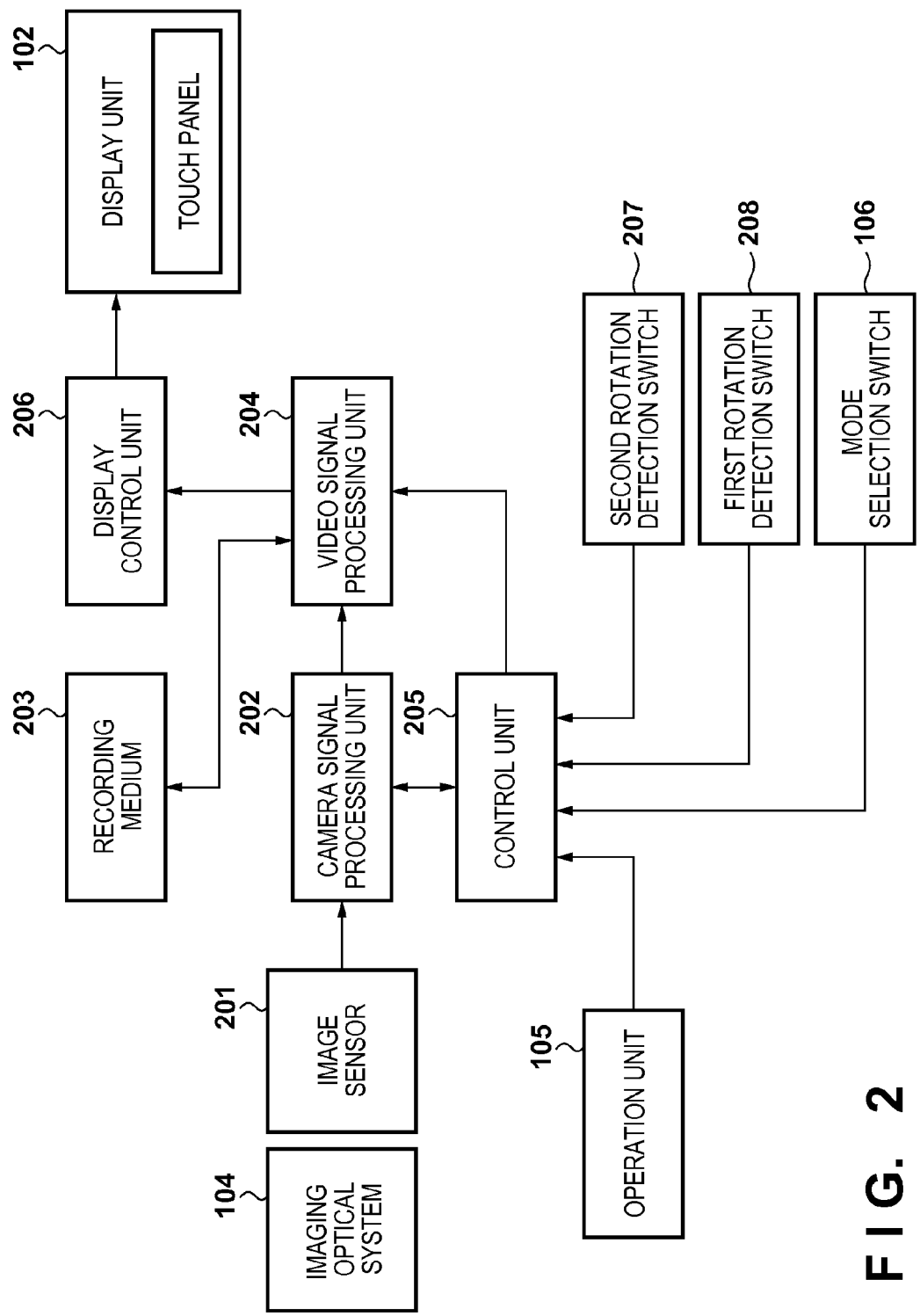
FIG. 2 is a block diagram showing the internal arrangement of the video camera according to the first embodiment.

FIG. 2 shows the internal arrangement of the video camera 100 according to this embodiment.

An image sensor 201 is formed from a CCD or CMOS sensor which converts an optical image of an object into an electrical signal. A camera signal processing unit 202 performs predetermined signal processing such as A/D conversion, pixel interpolation, and correction processing for the video signal output from the image sensor 201. The camera signal processing unit 202 outputs the processed data as movie data.

The video signal processing unit 204 performs processing of the input movie data in accordance with a frame rate and superimposing processing of a menu screen or the like and outputs the display movie data to a display control unit 206. When the user has pressed the recording button of the operation unit 105, the video signal processing unit 204 compresses the movie data in a predetermined format and records the compressed data on a recording medium 203. The movie data and image data recorded on the recording medium 203 are read out and decompressed. The decompressed data is output to the display control unit to display it on the display unit 102. Audio data in addition to movie data is also obtained and recorded in practice, although a detailed description thereof will be omitted because it is not directly relevant to the present invention. The audio data is obtained using, for example, a microphone and can be compression-coded in a predetermined method by the video signal processing unit 204.

The recording medium 203 is a recording medium such as a memory card for recording the shot movie and is made from a semiconductor memory or magnetic disk.

The control unit 205 includes a CPU, a ROM, and a RAM. The CPU loads a program stored in the ROM to the work area of the RAM and executes the program, thereby controlling the overall operation of the video camera 100. In addition, the control unit 205 executes programs stored in the ROM to implement the respective processes (to be described later) of this embodiment. The RAM loads operation constants and variables of the control unit 205 and programs read out from the ROM. The control unit 205 controls the ON/OFF state of display on the display unit 102 and the direction of information such as movie data and image data (to be referred to as display images hereinafter).

The display control unit 206 performs control such that the display image input from the video signal processing unit 204 is displayed on the display unit 102 under the control of the control unit 205.

A first rotation detection switch 208 and a second rotation detection switch 207 are switches to detect that the rotation position of the display unit 102 is set to predetermined values from a predetermined reference position. In the following description, a rotation angle is detected as a rotation position of the display unit 102. The first rotation detection switch 208 is a switch for detecting the rotation angle of the display unit 102 in the handwritten mode. The second rotation detection switch 207 is a switch for detecting the rotation angle of the display unit 102 in the normal mode. When the mode selection switch 106 selects the normal mode, the control unit 205 determines the rotation angle of the display unit 102 based on an output from the second rotation detection switch 207 and changes the direction of information of the display image displayed on the display unit 102. That is, the display image is subjected to vertical reversal or mirror reversal (horizontal reversal) in addition to vertical reversal by reversal processing. When the handwritten mode is selected, the control unit 205 determines the rotation angle of the display unit 102 based on the output from the first rotation detection switch 208 and performs reversal processing of the display image to be displayed. In the handwritten mode, the display image is displayed by being vertically reversed. The mirror reversal may be further performed in accordance with application purposes.

(2. Detailed Arrangement for Performing Reversal Processing of Display Image)

Figure 3A:
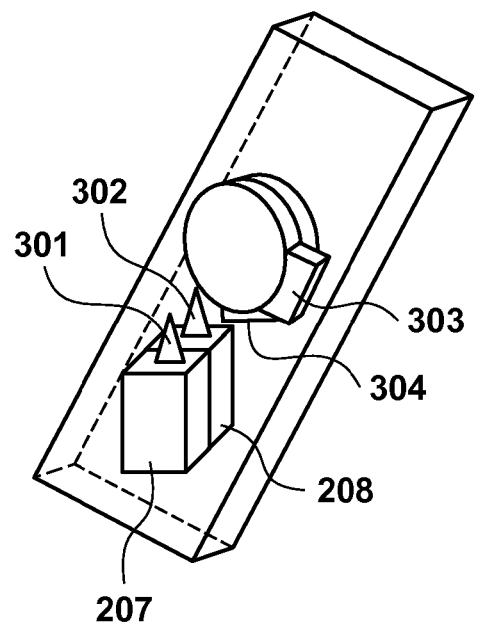
FIGS. 3A and 3B are views showing the arrangement of a switch inside a hinge according to the first embodiment.
Figure 3B:
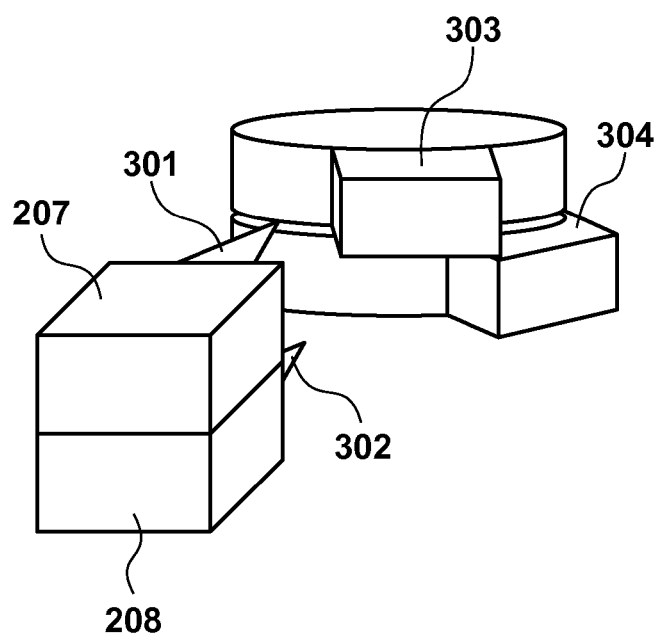

FIGS. 3A and 3B are views showing the structure of a switch portion inside the hinge portion 103 used in the first embodiment. FIG. 3A is a schematic sectional view when the hinge portion 103 of FIG. 1 is taken along the x-z plane. FIG. 3B is an enlarged view when viewed from the −x (minus x) direction of FIG. 1. The hinge portion 103 incorporates the second rotation detection switch 207 and the first rotation detection switch 208. The second rotation detection switch 207 is turned on when the display unit 102 is rotated and a normal mode switch 301 is physically pressed and reaches the rotation angle in the normal mode. Similarly, the first rotation detection switch 208 is turned on when the display unit 102 is rotated, and a handwritten mode switch 302 is physically pressed and reaches the rotation angle in the handwritten mode. The hinge portion 103 includes a normal mode projection 303 and a handwritten mode projection 304 which are made from members (for example, metal members) having rigidity to press the respective switches.

When the display surface of the display unit 102 rotates from the x-y plane to the y-z plane (that is, a direction indicated by an arrow B) with respect to the y-axis direction as the rotation axis as shown in FIG. 1, an angle through which the display unit 102 rotates from the position shown in FIG. 1 is defined as $\theta$. When a state in which the display unit 102 is opened for the first time from the video camera body 101 is defined as $\theta=0°$, a reversing angle of the display image in the normal mode is represented by a threshold $\alpha$ and a reversing angle of the display image in the handwritten mode is represented by a threshold $\beta$. At this time, the normal mode projection 303 presses the normal mode switch 301 in a range of $\alpha \le \theta \le 180°$. The handwritten mode projection 304 presses the handwritten mode switch 302 in a range of $\beta \le \theta \le 180°$. Note that the start point of the rotation angle is not limited to the one described above, but an angle is set to make the reversal display in the handwritten mode earlier than the reversal display in the normal mode. For example, an angle formed between the plane perpendicular to the bottom surface of the video camera 100 and the display surface of the display unit 102 may be used.

Figure 4A:
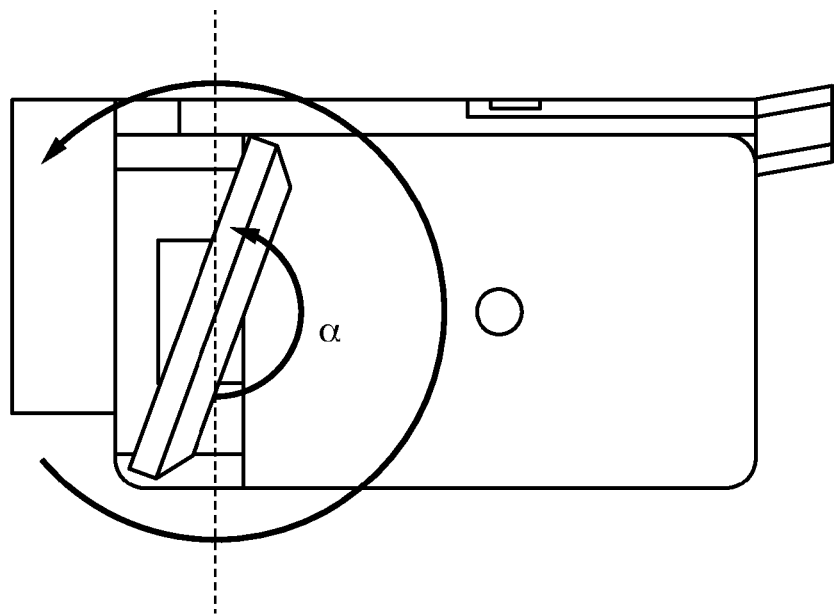
FIGS. 4A and 4B are views showing an angle serving as a threshold in a normal mode and an angle serving as a threshold in a handwritten mode according to the first embodiment.
Figure 4B:
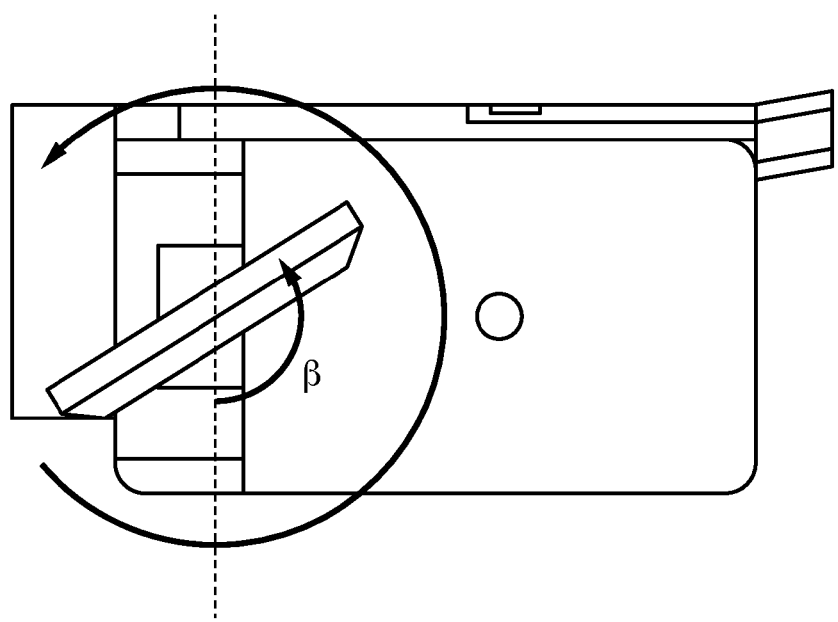

FIG. 4A shows a state in which the display unit 102 of the video camera rotates through the angle $\alpha$, while FIG. 4B shows a state in which the display unit 102 rotates through the angle $\beta$. As will be described later, in order to set the angle of the display surface to an angle which facilitates a handwritten input, the rotation angle $\beta$ for reversing the display image in the handwritten mode is set to be a smaller value than the rotation angle $\alpha$ for reversing the display image in the normal mode.

Figure 5:
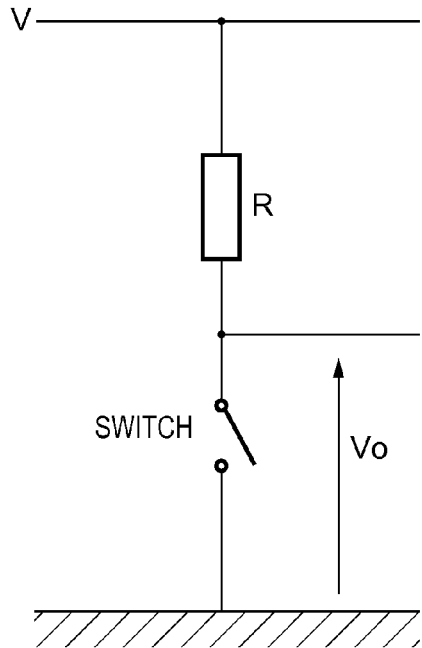
FIG. 5 is a diagram showing the circuit of a switch according to the first embodiment.

FIG. 5 shows the circuit of each of the second rotation detection switch 207 and the first rotation detection switch 208 according to the first embodiment. When each switch is pressed at the corresponding predetermined rotation angle, the switch is turned on, that is, a voltage across the switch is set at Vo=0 (V). When each switch is not pressed, that is, when the switch is kept off, the voltage across the switch is set at Vo≈V (V). The control unit 205 causes the display control unit 206 to display selection such as reversal via the video signal processing unit 204 with reference to the voltage across the switch.

Figure 6:
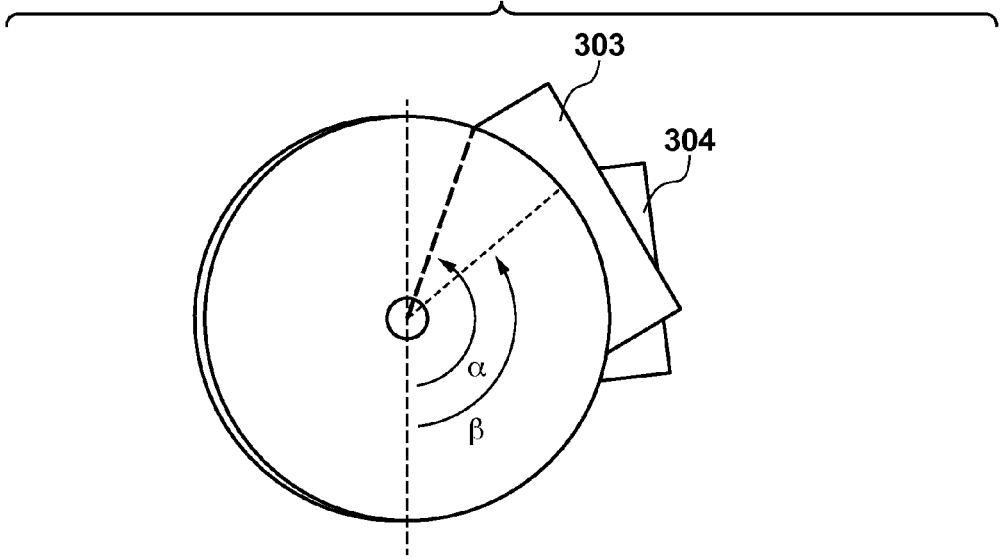
FIG. 6 shows the ranges of rotation angles detected in the normal mode and the handwritten mode according to the first embodiment.

FIG. 6 shows the relationship between the angles of the display unit 102 and the switches when two types of switches, that is, the normal mode switch 301 and the handwritten mode switch 302 are used. As in the description with reference to FIGS. 3A and 3B, a rotation angle for switching the display image in the normal mode is given by the threshold $\alpha$, and a rotation angle for switching the display image in the handwritten mode is given by the threshold $\beta$. The table in FIG. 6 shows the states of the normal mode switch 301 and the handwritten mode switch 302 when the normal mode projection 303 and the handwritten mode projection 304 for pressing the respective switches are set at the rotation angles, respectively. When the rotation angle is more than the rotation angle $\alpha$, the normal mode switch 301 is turned on. When the rotation angle is more than the rotation angle $\beta$, the handwritten mode switch 302 is turned on. The control unit 205 performs the reversal processing of an image to be displayed on the display unit 102 when each switch is turned on in the corresponding mode.

When the normal mode or the handwritten mode is selected by the mode selection switch 106, the detection angle is set at $\alpha$ for the normal mode or $\beta$ for the handwritten mode. Note that $\alpha$ and $\beta$ satisfy relation $\alpha > \beta$, as shown in FIG. 4. When the normal mode is selected and $\theta > \alpha$ is satisfied, the control unit 205 performs reversal processing of an image displayed on the display unit 102. When the handwritten mode is selected and $\theta > \beta$ is satisfied, the control unit 205 performs reversal processing of an image displayed on the display unit 102. When a right-handed user inclines the display unit 102 to an angle which facilitate the operation, the reversed image is displayed to facilitate a handwritten input to the display unit 102. In other words, by changing the reversal processing rotation angle between the handwritten mode and the normal mode, an image reversed at an angle to facilitate the operation upon rotation of the display unit 102 is displayed, thereby facilitating the handwritten input. In addition, obviously, when the video camera 100 is placed on a flat surface, the handwritten input can be facilitated.

Note that in this embodiment, the on/off states of the two types of rotation detection switches 207 and 208 allow detection of the states in which the display unit 102 is set at the rotation angles determined by the respective thresholds. However, a sequentially detected rotation position of the display unit 102 may be compared with a threshold to determine whether the rotation angle reaches the threshold. The threshold $\beta$ of the rotation angle may be a fixed value set in advance in the video camera 100 or a value which can be set by an operation of the touch panel 209 or the like by the user. When the threshold β can be set as a value to be set by the user, the rotation angle for reversing the display image can be adjusted in accordance with the use environment or the favor of the user. The user friendliness can advantageously be further improved.

(3. Operation about Reversing Processing of Display Image)

Figure 7:
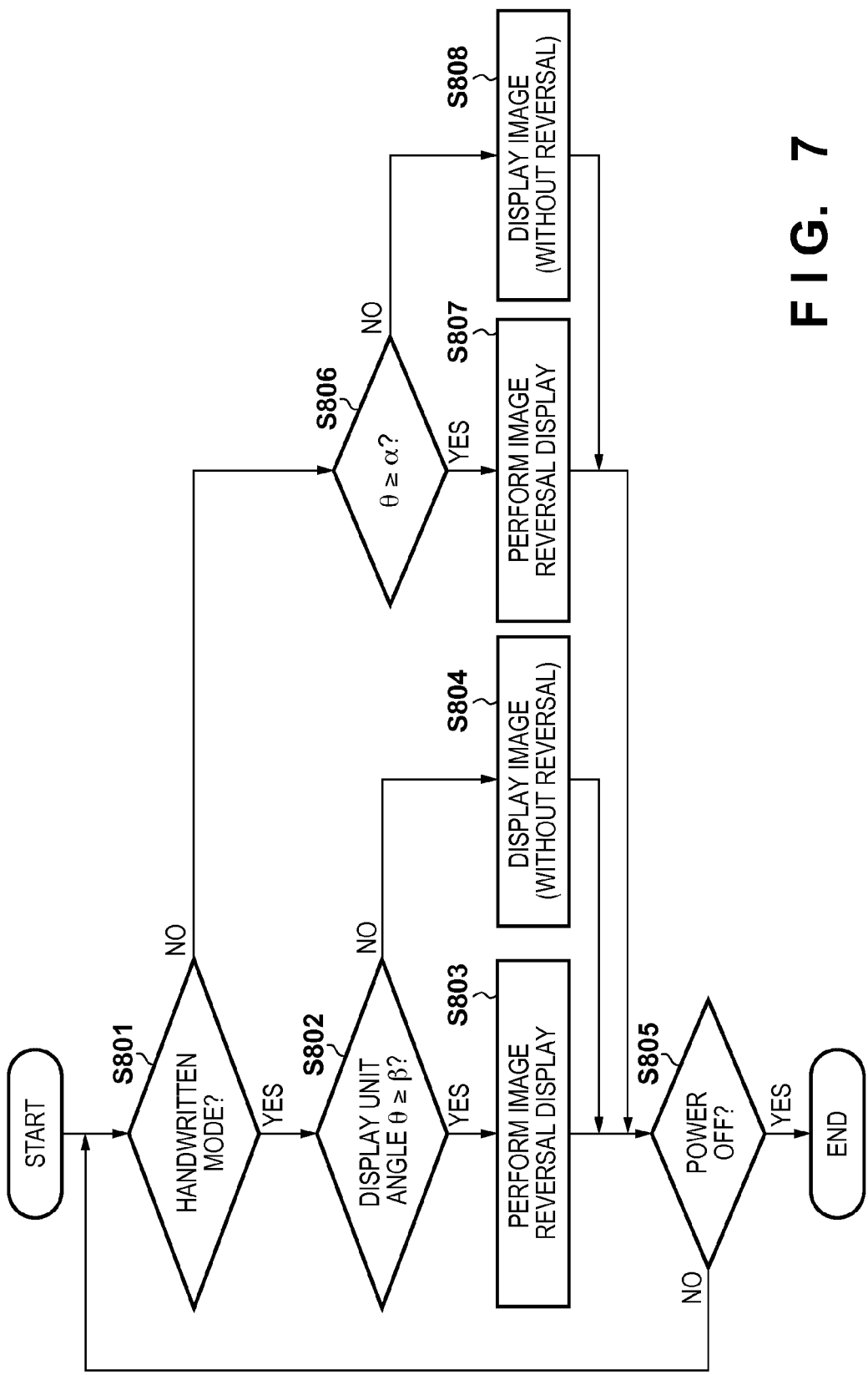
FIG. 7 is a flowchart showing a series of operations in reversal processing of a display image.

A series of operations of reversal processing of a display image based on the rotation angle of the display unit 102 will be described with reference to FIG. 7.

Assume that the video camera 100 displays, on the display unit 102, an image selected by the user from the image list recorded on the recording medium 203 for example while the display unit 102 is open. Processing in FIG. 7 is implemented by causing the control unit 205 to load, in the work area of the RAM, a program started upon rotating the display unit 102 by the user and stored in the ROM, and execute the program.

In step S801, the control unit 205 refers to the state of the mode selection switch 106 to determine whether the handwritten mode is set. When the set mode is the handwritten mode, the control unit 205 advances the process to step S802. If the set mode is not the handwritten mode, that is, the set mode is the normal mode, the process advances to step S806.

The control unit 205 determines in step S802 whether the rotation angle θ of the display unit 102 is equal to or more than the threshold β. More specifically, the control unit 205 refers to the voltage across the first rotation detection switch 208 and determines that the rotation angle θ of the display unit 102 is equal to or more than the threshold β when the voltage is set in the ON state. The process advances to step S803. On the other hand, when the voltage across the switch 208 is set in the OFF state, the control unit 205 determines that the rotation angle θ of the display unit 102 is smaller than β. The process then advances to step S804.

In step S803, the control unit 205 causes the display unit 102 to display a reversed image via the display control unit 206. On the other hand, in step S804, the control unit 205 causes the display unit 102 to display a non-reversed image because the rotation angle θ does not reach an angle required for the image reversal.

In step S805, the control unit 205 determines whether the video camera 100 is set in a power OFF state. If the video camera 100 is set in the ON state, the same processing as described above is repeated, and the process returns to step S801 to refer to the state of the mode selection switch 106. When the power OFF state is set, the control unit 205 completes a series of operations of this processing.

On the other hand, it is determined in step S801 that the mode is not the handwritten mode, that is, the mode is set in the normal mode, the control unit 205 determines in step S806 whether the rotation angle θ is equal to or more than the threshold α. The control unit 205 refers to the voltage across the second rotation detection switch 207 and it is determined that the voltage across the switch 207 is set in the ON state, the control unit 205 determines that the rotation angle θ is equal to or more than the threshold α. The process then advances to step S807; otherwise, the process advances to step S808.

Since the control unit 205 determines in step S807 that the rotation angle θ is equal to or more than the threshold α, the control unit 205 determines that the display unit 102 is rotated to perform facing shooting. The reversed image is displayed on the display unit 102. When the control unit 205 completes the image display on the display unit 102, the process advances to step S805.

In step S808, the control unit 205 displays the image on the display unit 102 without the reversal processing because the control unit 205 need not reverse the image. When the control unit 205 completes the display on the display unit 102, the process advances to step S805.

This embodiment assumes that the rotation axis of the display unit 102 is an axis which passes through the hinge portion 103 serving as the connecting portion between the video camera body 101 and the display unit 102 and is perpendicular to the optical axis. However, the rotation axis is not limited to this. If the display unit 102 can rotate to allow facing shooting and normal shooting, another rotation axis, that is, an axis parallel to the above rotation axis may be used as a rotation axis.

As described above, according to this embodiment, an image or any other information to be displayed in the handwritten mode is different from that in the normal mode. This makes it possible to appropriately display the image and any other information for the handwritten input on the display unit 102 rotatable with respect to the video camera body 101. That is, the handwritten input to the display unit 102 can be facilitated by reversing an image displayed on the display unit when the display unit 102 is rotated up to the angle β convenient for the user in the handwritten mode. According to this embodiment, even if the video camera 100 is placed on a flat surface, an input to the display unit 102 can be facilitated because the display surface of the display unit 102 can be reversed at a rotation angle different from the rotation angle used for facing shooting.

Second Embodiment

The second embodiment will be described below. Unlike in the first embodiment, the reversal display of a display image can be performed using one sensor without using two types of switches in the second embodiment. For the control of reversal processing of the display image of the second embodiment, a Hall element 901 and a magnet 902 which detect a change in magnetic force along with rotation of a display unit 102 are used in place of the second rotation detection switch 207 and the first rotation detection switch 208 in the first embodiment. Any other arrangement is the same as in the first embodiment. The same parts as in the first embodiment denote the same reference numerals, and a repetitive description will be omitted. Different points will be mainly described below.

Figure 8:
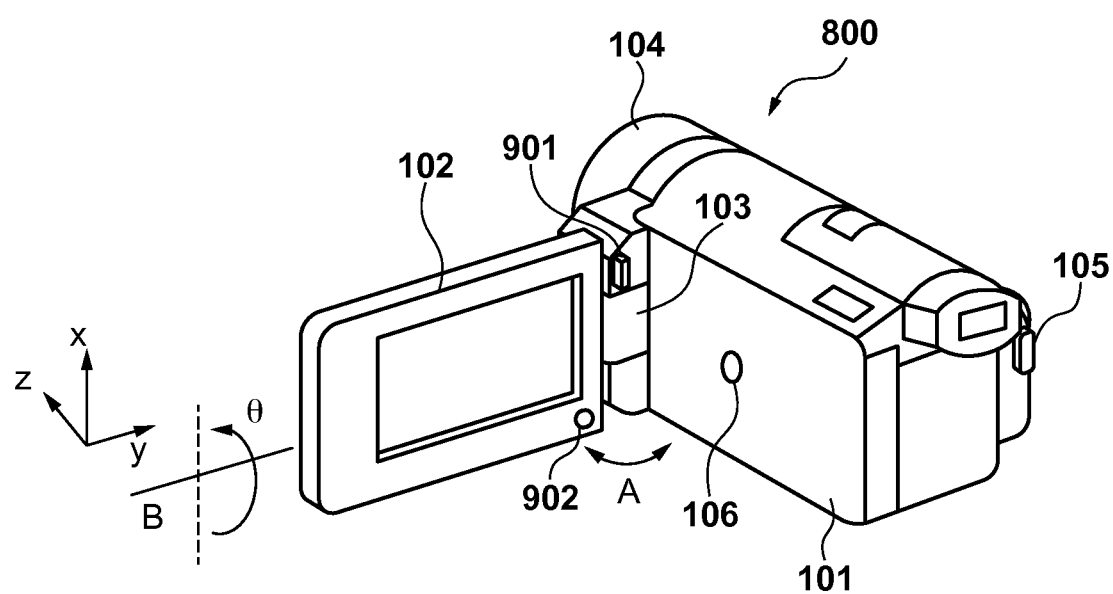
FIG. 8 is a perspective view of a video camera according to the second embodiment.

FIG. 8 shows the outer appearance of a video camera 800 according to the second embodiment. For example, the Hall element 901 is arranged at a position at the upper portion of a video camera body 101. The magnet 902 is arranged on a display unit 102 at a position which comes close to the Hall element 901 when a display unit 102 is rotated through 180°.

Figure 9:
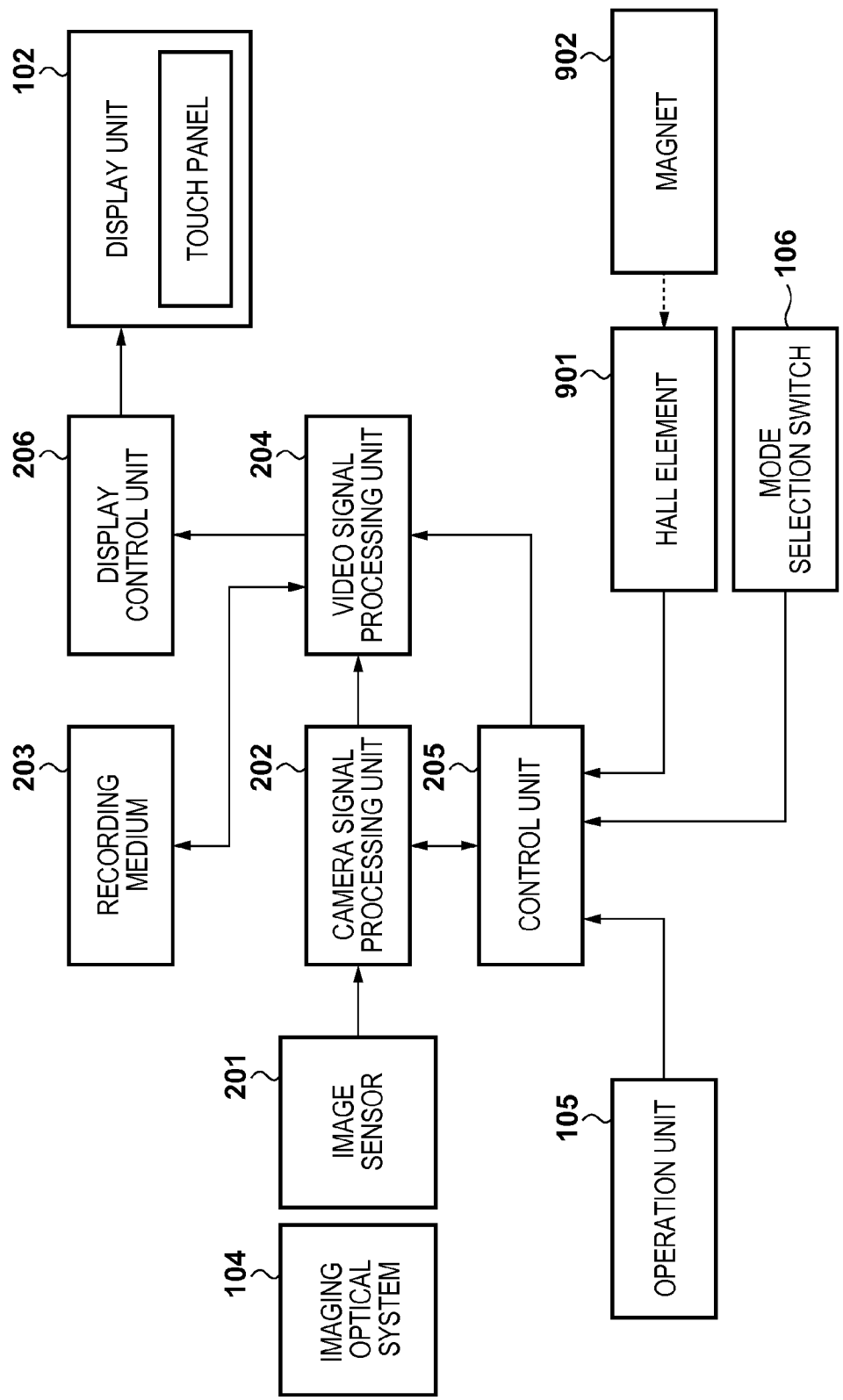
FIG. 9 is a block diagram showing the internal arrangement of the video camera according to the second embodiment.

FIG. 9 shows the arrangement of the video camera 800 of this embodiment. The Hall element 901 and the magnet 902 are mounted in place of the rotation detection switches. The intensity of a magnetic force generated by the magnet 902 is detected by the Hall element 901, and the measurement result is output to a control unit 205 in accordance with a predetermined method. Since the Hall element 901 is fixed to the video camera body 101, and the magnet 902 is mounted on the display unit 102, the control unit 205 determines the rotation position of the display unit 102 in accordance with a change in magnetic force received from the magnet 902.

Figure 10:
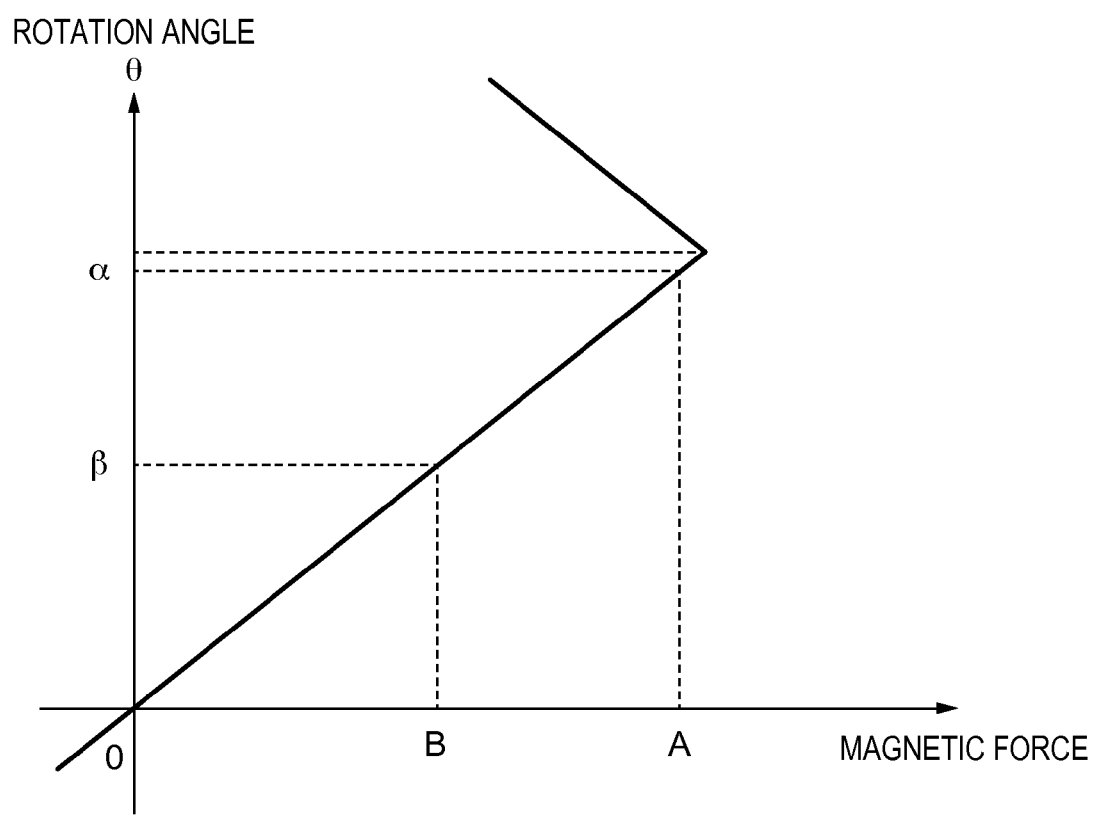
FIG. 10 is a graph conceptually showing the relationship between the rotation angle of the display unit and a magnetic force detected by a Hall element according to the second embodiment.

FIG. 10 is a graph conceptually showing the relationship between a rotation angle θ obtained upon rotation of the display unit 102 shown in FIG. 8 and the magnetic force detected by the Hall element 901. The magnetic force detected by the Hall element 901 is plotted along the abscissa, and the rotation angle θ is plotted along the ordinate. When the display unit 102 is rotated and the distance between the Hall element 901 and the magnet 902 comes closer, the Hall element 901 detects a stronger magnetic force. In this embodiment, the magnetic force detected at the closest position of the magnet 902 upon rotation of the display unit 102 through 180° has a peak. For the illustrative simplicity of the graph, the graph indicates a case in which the magnetic force detected by the Hall element 901 and the rotation angle is linear. However, the relationship between the magnetic force detected by the Hall element 901 and the rotation angle is not limited to this if the detection result becomes larger when the magnet 902 comes closer to the Hall element 902 along with the rotation of the display unit 102. When the Hall element 901 detects a magnetic force equal to or larger than a predetermined force, the Hall element 901 notifies the control unit 205 of the result. The control unit 205 then performs control in accordance with the detection result. Assume that the rotation angle θ obtained when the display unit 102 is rotated and the magnetic force reaches B is defined as the first angle β, and the rotation angle θ obtained when the display unit 102 is rotated to obtain a magnetic force A is defined as a second angle α. With this arrangement, the control unit 205 can perform the reversal processing for the normal mode with the threshold α for the normal mode in accordance with the output from the Hall element 901. On the other hand, the control unit 205 can perform reversal processing for the handwritten mode with the threshold β. Note that since the reversal processing of the display image of this embodiment is the same as in the first embodiment, and a description thereof will be omitted.

As has been described above, according to this embodiment, by detecting the different rotation angles used for reversal processing from the magnetic forces, the handwritten input to the display unit 102 can be facilitated, and the video camera 100 can be arranged without using the two mechanical switches. In addition, since the mechanical switches need not be used, the structure of the hinge portion 103 can be simplified.

Third Embodiment

The third embodiment will now be described below. A video camera 1100 according to the third embodiment is different from the arrangement of the first embodiment in that support portions (projection portions 1101) are added to the four corners of the bottom surface of a video camera body 101 to support the video camera 1100. The remaining parts are the same as those of the first embodiment. The same parts denote the same reference numerals, and a detailed description thereof will be omitted. Different parts will mainly be described below.

Figure 11:
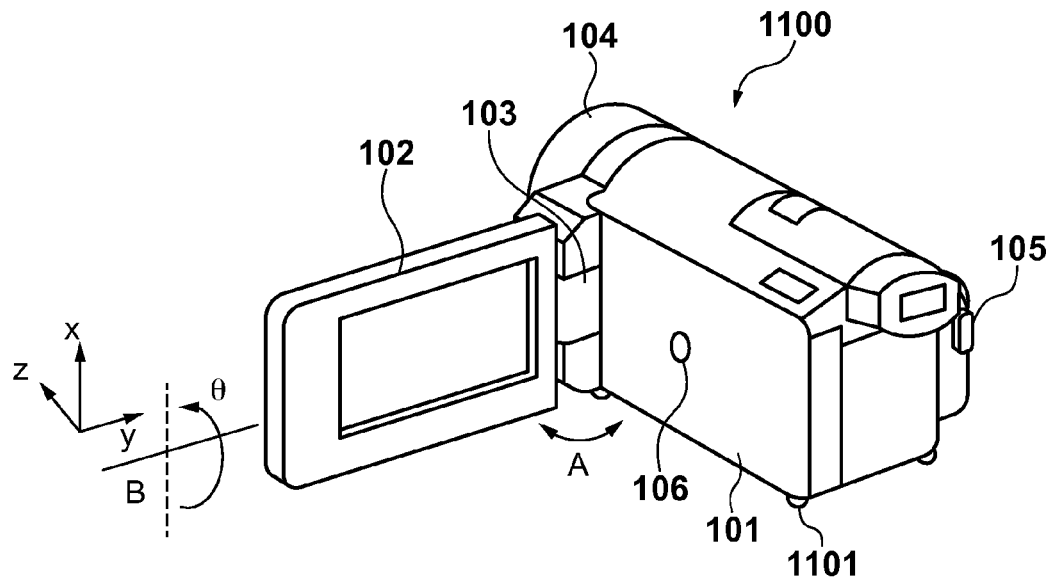
FIG. 11 is a perspective view of a video camera according to the third embodiment.

The arrangement of the video camera 1100 according to the third embodiment will be described below. When a placement location of the video camera 1100 of the first embodiment is not a flat surface such as a desk but a surface with a step or projection, it is assumed that the posture of the video camera 100 is not stable. In this embodiment, as shown in FIG. 11, the projection portions 1101 are formed at the four corners of the bottom surface of the video camera body 101 of the first embodiment. The projection portions 1101 are formed at a height so that the video camera 1100 is horizontal and stable when it is placed on a surface with a step or projection. That is, when the video camera 1100 is placed on the surface with a step or projection, the video camera 1100 is set in a stable posture due to the presence of the projection portions 1101. Even if the user inclines the display unit 102, the stable handwritten input can be performed.

As has been described above, according to this embodiment, since the projection portions 1101 are formed on the bottom surface of the video camera 1100, the video camera body can be supported with a stable posture, the user can easily perform the handwritten input. That is, according to this embodiment, the video camera body can be placed in a stable state in addition to the reversal processing control in accordance with the rotation angle of a display unit 102 as described in the first embodiment. Therefore, the handwritten input to the display unit 102 can further be facilitated.

Fourth Embodiment

The fourth embodiment will now be described below. In the fourth embodiment, the present invention according to the first embodiment can be made effective for only a left-handed user. The arrangement of a video camera according to this embodiment is the same as in the first embodiment except that the camera includes a left-handed user switch 1201. The same parts as in the first embodiment denote the same reference numerals and a repetitive description will be omitted. Different points will mainly be described.

The digital cameras described in the above embodiments have been described for the right-handed user. The left-handed user has no problem that the hand contacts a video camera body 101 to make it difficult to perform a handwritten input. The left-handed user can perform a handwritten input while the digital camera is placed on a flat surface without setting a display unit 102 in a state of facing shooting. For this reason, when the handwritten mode is set using a mode selection switch 106 and the reversal processing of the display image illustrated in the first embodiment is performed, inconvenience occurs for the left-handed user.

According to this embodiment, by providing the left-handed user switch 1201, the reversal processing of the display image on the display unit 102 shown in the first embodiment is performed unless the use by the left-handed user is explicitly indicated. In other words, when the left-handed user switch 1201 is set, the reversal processing of the display image in the first embodiment is inhibited even if the handwritten mode is set. Control is made in the normal mode.

Figure 12:
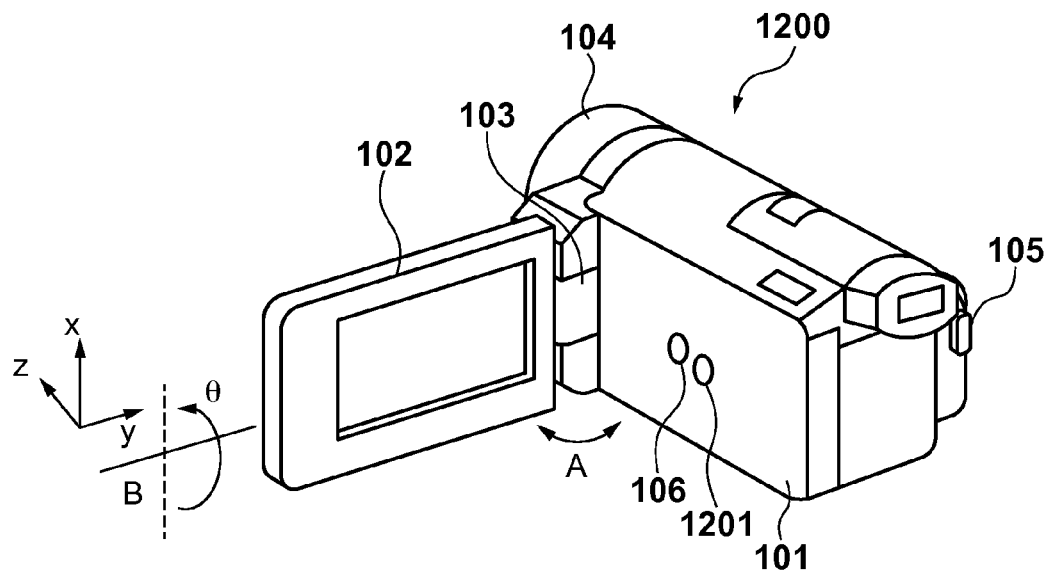
FIG. 12 is a perspective view of a video camera according to the fourth embodiment.
Figure 13:
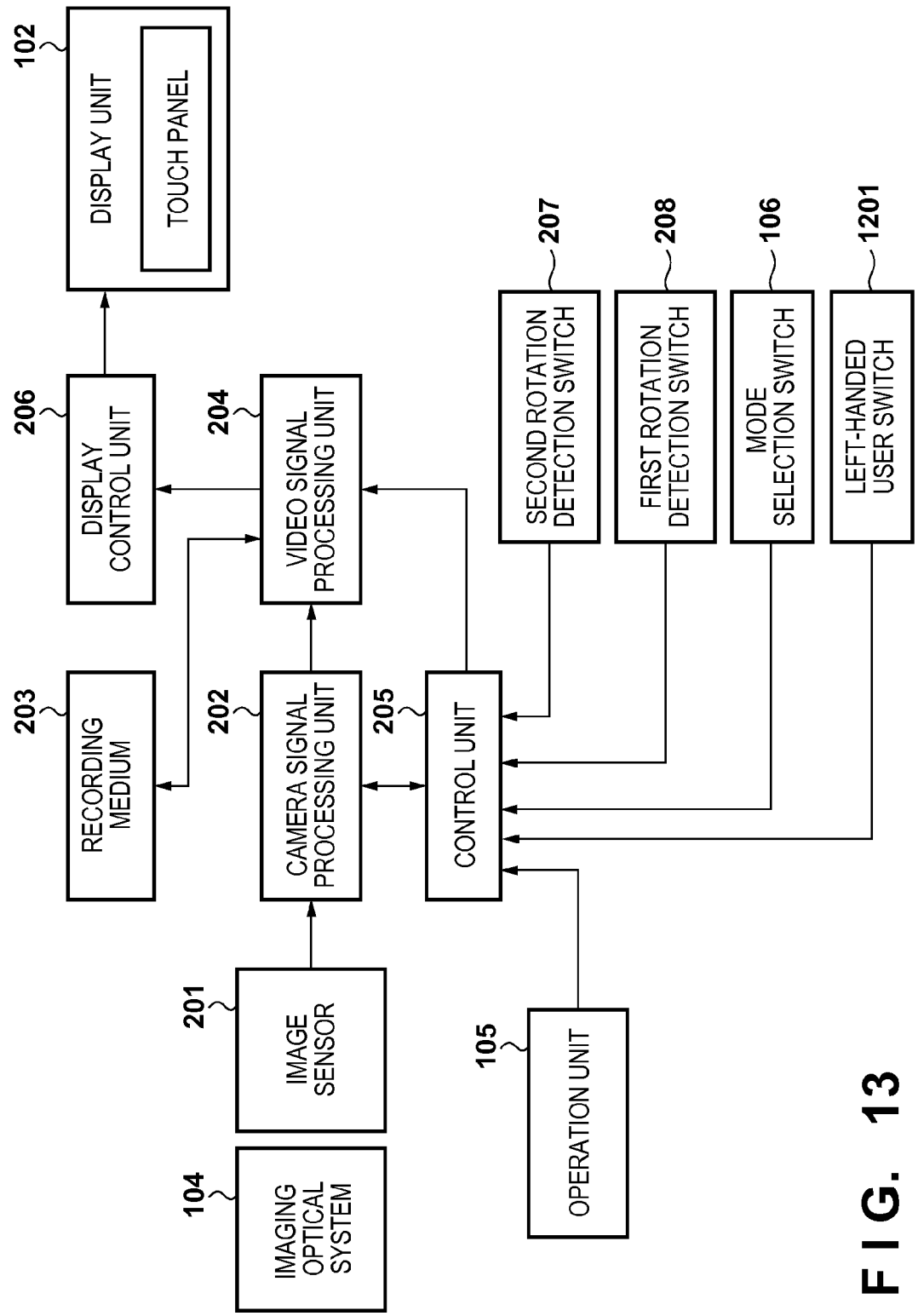
FIG. 13 is a block diagram showing the internal arrangement of the video camera according to the fourth embodiment.

FIG. 12 shows the outer appearance of a video camera 1200 according to the fourth embodiment. The video camera 1200 is provided with the left-handed user switch 1201 for setting that the user is the left-handed user. A state in which the left-handed user switch 1201 is connected to a control unit 205 is shown in the block diagram (FIG. 13) showing the functional arrangement example of the video camera 1200. The detection of the rotation angle of a first rotation detection switch 208 is neglected by the control unit 205 in accordance with the setting condition of the left-handed user switch 1201.

Figure 14:
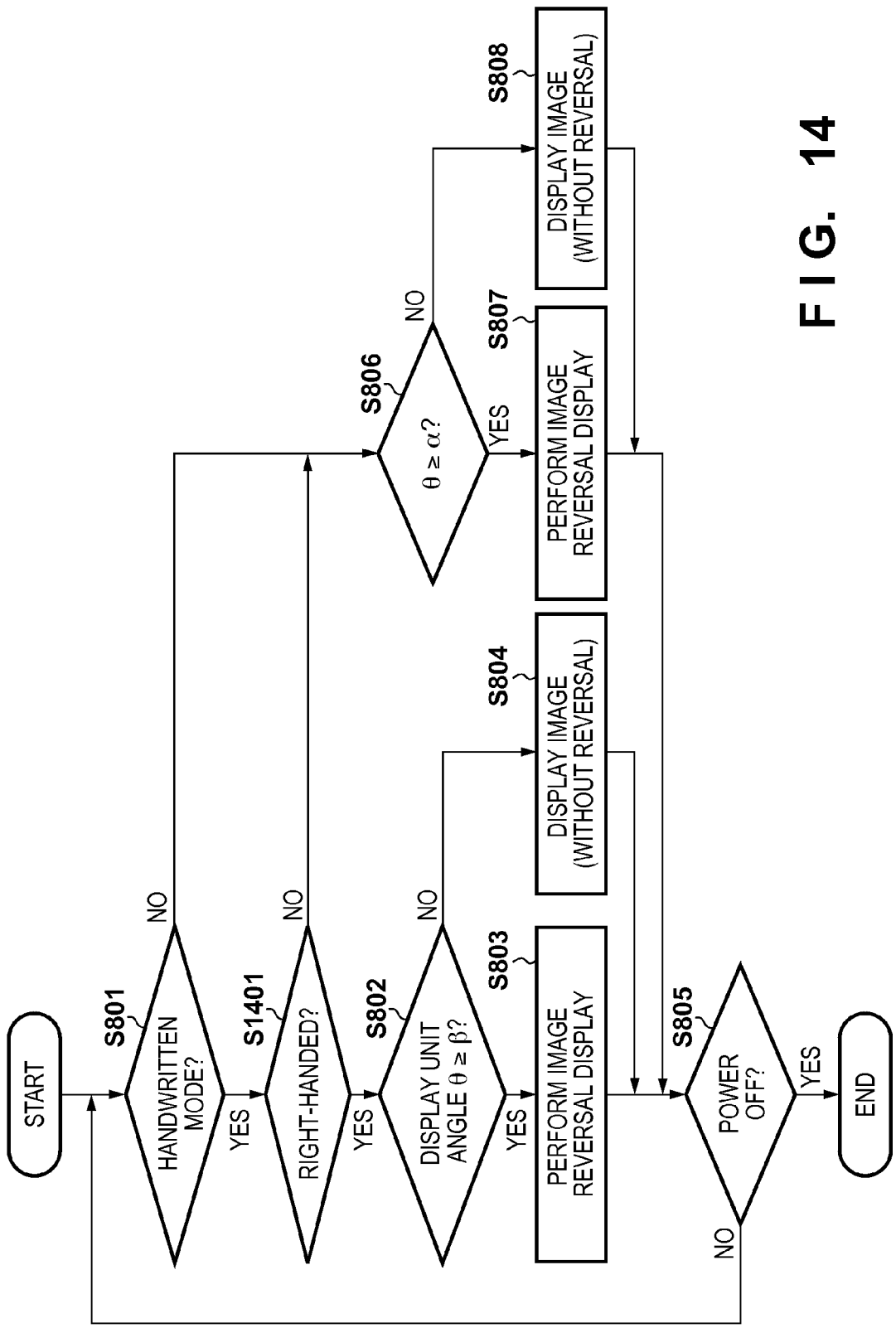
FIG. 14 is a flowchart showing a series of operations of reversal processing of a display image using rotation angle detection according to the fourth embodiment.

FIG. 14 is a flowchart showing a series of operations of the reversal processing of the display image according to the fourth embodiment. The same steps as in the flowchart in the first embodiment denote the same reference symbols, and a detailed description will be omitted. In the operation of this processing, determination for determining whether the left-handed user switch 1201 is pressed upon determination for determining whether the handwritten mode is set is added.

In step S1401, the control unit 205 obtains the state of the left-handed user switch 1201 and determines whether the setting is the right-handed user setting. When the control unit 205 determines that the setting is the right-handed user setting, the control unit 205 performs reversal processing of the image display at the rotation angle β satisfying the condition α<β as in the first embodiment. The process then advances to step S802. On the other hand, if the control unit 205 determines that the setting is not the right-handed user setting (that is, the left-handed user setting), the control unit 205 performs the reversal processing according to the rotation angle α corresponding to the normal mode without the reversal processing using the rotation angle β. The process then advances to step S806. The subsequent processing is the same as in the first embodiment. The left-handed user can perform a handwritten input without reversal display on the display unit 102 at the angle β.

As described above, according to this embodiment, the left-handed user mode is newly added to facilitate the handwritten input on the display unit 102. In addition, the reversal processing can be performed for only a user requiring the reversal processing of the display image in the handwritten mode. Since the display image is not reversed before the display unit 102 is set in the facing state, the left-handed user can easily perform the handwritten input by drawing with a finger or electronic pen.

As has been described above, each of the above embodiments has exemplified a case in which the present invention is applied to the image capturing apparatus such as a video camera. The present invention is not limited to this and is applicable to an apparatus in which a handwritten input mode can be switched with respect to the display surface of the display unit.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-083988, filed Apr. 15, 2014, which is hereby incorporated by reference herein in its entirety.

What is claimed is:

1. An image capturing apparatus comprising:
    a display unit connected to an apparatus through a movable portion so that a direction of a display surface is changeable;
    a detection unit configured to detect a rotation position of the display unit; and
    a display control unit configured to perform a change in a direction of information displayed on the display surface based on comparison between the detected rotation position and a threshold,
    wherein the display control unit sets such that a first threshold serving as a threshold of the rotation position in a mode in which a handwritten input to the display surface is allowed is made different from a second threshold serving as a threshold of the rotation position in another mode.

2. The apparatus according to claim 1, wherein the display unit is rotatable about a first axis and a second axis which are perpendicular to an optical axis,
    the first axis is defined as an axis for opening and closing the display unit in a lateral direction when the image capturing apparatus is set in a horizontal state, and the second axis is defined as an axis for rotating the display unit in a back-and-forth direction, and
    the display control unit does not perform the change in a range in which a rotation position of the display unit about the second axis does not exceed a first angle indicated by the first threshold from a state in which the display unit is opened for the first time.

3. The apparatus according to claim 1, wherein an angle between the display surface and a surface perpendicular to a bottom surface of the image capturing apparatus in the first threshold is set to be smaller than an angle between the display surface and a surface perpendicular to the bottom surface of the image capturing apparatus in the second threshold.

4. The apparatus according to claim 1, further comprising a support portion configured to support a posture of the image capturing apparatus in a predetermined state.

5. A non-transitory computer-readable storage medium storing a program causing a computer to function the each unit of the image processing apparatus according to claim 1.

6. The apparatus according to claim 2, wherein the display control unit performs the change in the mode in which the handwritten input is allowed when a rotation position of the display unit about the second axis falls within a range at least from the first angle to a second angle indicated by the second threshold.

7. The apparatus according to claim 6, wherein the detection unit comprises a first detection unit configured to detect the first angle and a second detection unit configured to detect the second angle.

8. The apparatus according to claim 6, wherein the detection unit detects the first angle and the second angle by detecting changes in magnetic field along with rotation of the display unit.

9. The apparatus according to claim 2, wherein the display control unit does not perform the change in the other mode in a range in which a rotation position of the display unit about the second axis does not exceed a second angle indicated by the second threshold.

10. The apparatus according to claim 2, further comprising an inhibition unit configured to set inhibition of the change of the display unit,
wherein when the inhibition unit is set to inhibit the change, the display control unit does not perform the change even if a rotation position of the display unit about the second axis exceeds the first angle.

11. The apparatus according to claim 2, further comprising a setting unit configured to allow a user to set the first angle.

12. The apparatus according to claim 3, wherein the display control unit performs vertical reversal and further mirror reversal of a direction of information displayed on the display surface.

13. A control method of an image capturing apparatus including a display unit connected to an apparatus through a movable portion so that a direction of a display surface is changeable, the control method comprising:
a detection step of detecting a rotation position of the display unit; and
a display control step of performing a change in a direction of information displayed on the display surface based on comparison between the detected rotation position and a threshold,
wherein in the display control step, a first threshold serving as a threshold of the rotation position in a mode in which a handwritten input to the display surface is allowed is made different from a second threshold serving as a threshold of the rotation position in another mode.

* * * * *